United States Patent [19]
Mori et al.

[11] Patent Number: 5,895,094
[45] Date of Patent: Apr. 20, 1999

[54] HEADREST APPARATUS FOR VEHICLE SEAT

[75] Inventors: Masatoshi Mori, Toyota; Hideo Nihonmatsu, Chiryu, both of Japan

[73] Assignee: Aisin Seiki Kabushiki Kaisha, Japan

[21] Appl. No.: 08/834,801

[22] Filed: Apr. 3, 1997

[30] Foreign Application Priority Data

Apr. 8, 1996 [JP] Japan .................... 8-085092

[51] Int. Cl.⁶ .................................. A47C 7/46
[52] U.S. Cl. ............................ 297/410; 297/391
[58] Field of Search .................... 297/410, 391, 297/396

[56] References Cited

U.S. PATENT DOCUMENTS

| | | | |
|---|---|---|---|
| 3,512,832 | 5/1970 | Kage | 297/410 |
| 3,512,833 | 5/1970 | Sugiura | 297/410 |
| 3,542,429 | 11/1970 | Inoue | 297/410 |
| 3,563,602 | 2/1971 | Ohta | 297/410 |
| 3,567,282 | 3/1971 | Ohta et al. | 297/410 |
| 3,608,965 | 9/1971 | Cziptschirsch | 297/410 |
| 4,411,470 | 10/1983 | Nishimura et al. | 297/410 |
| 4,483,565 | 11/1984 | Terui et al. | 297/410 |
| 4,545,618 | 10/1985 | Kitamura | 297/410 |
| 4,560,202 | 12/1985 | Koelle et al. | 297/391 X |
| 4,589,698 | 5/1986 | Suzuki | 297/410 |
| 4,671,573 | 6/1987 | Nemoto et al. | 297/410 |
| 4,674,796 | 6/1987 | Weinich et al. | 297/410 X |
| 4,693,515 | 9/1987 | Russo et al. | 297/391 |
| 4,854,642 | 8/1989 | Vidwans | 297/410 |
| 4,976,493 | 12/1990 | Frankila | 297/410 |
| 5,056,867 | 10/1991 | Foster et al. | 297/410 |
| 5,156,440 | 10/1992 | Vidwans | 297/410 |
| 5,228,183 | 7/1993 | Saeki | 297/410 X |
| 5,398,996 | 3/1995 | Steiner | 297/410 X |
| 5,478,136 | 12/1995 | Takeuchi et al. | 297/391 |
| 5,590,929 | 1/1997 | Hamelin | 297/410 X |
| 5,660,441 | 8/1997 | Nagayasu et al. | 297/391 X |

FOREIGN PATENT DOCUMENTS

| | | |
|---|---|---|
| 19517932 | 11/1996 | Germany . |
| 59-14530 | 1/1984 | Japan . |
| 3-76734 | 7/1991 | Japan . |
| WO 94/01302 | 1/1994 | WIPO . |

*Primary Examiner*—Jose V. Chen
*Assistant Examiner*—Rodney B. White
*Attorney, Agent, or Firm*—Finnegan, Henderson, Farabow, Garrett & Dunner, L.L.P.

[57] ABSTRACT

A headrest apparatus for a vehicle seat. The seat has a seat cushion and a seat-back to support the back of a user of the seat. The headrest apparatus has a holder on a top portion of the seat-back; a stay having first and second supporting portions in parallel, the holder holding the stay so that the stay can slide relative to the seat back along the direction of the seat back; and a headrest body attached to the stay. The first stay includes a plurality of first notches for maintaining the position of the headrest body, the plurality of first notches defining an adjusting area of the headrest body. The second stay includes at least one second notch, the second notch defining a storage area of the headrest body different from the adjusting area. The operator can lower the headrest into the storage area even if the vehicle seat is a rear seat. This improves the operator's field of vision when necessary.

2 Claims, 4 Drawing Sheets

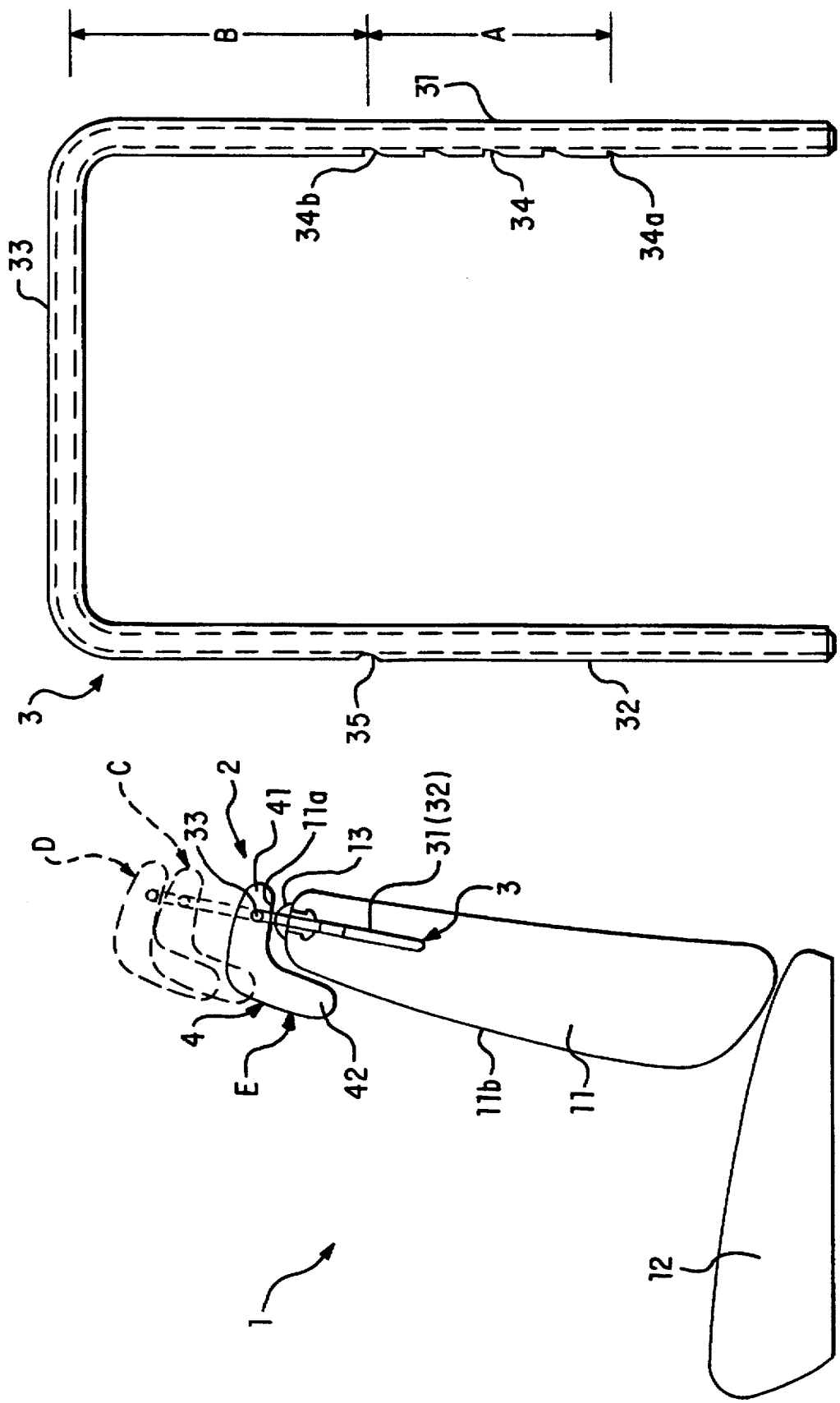

HEADREST APPARATUS FOR VEHICLE SEAT

BACKGROUND OF THE INVENTION

1. Field of the Invention

The present invention generally relates to a headrest apparatus for a vehicle seat.

2. Discussion of the Related Art

A headrest apparatus for a vehicle seat is disclosed in Japanese Utility Model laid-open publication No. 3 (1991)-76734.

The headrest apparatus includes a holder, a stay, and a headrest body. The holder is mounted on the top portion of a seat-back. The stay has a pair of supporting portions. The supporting portions of the stay are slidably supported by the holder. The headrest body is attached to the stay. A plurality of notches are formed in one of the supporting portions of the stay. A slidable lock plate, mounted on the holder, engages and disengages the notches.

When the lock plate slides, the lock plate disengages from the notches. The headrest body moves downward, thus placing it in a stored position. However, in this case, the stored position corresponds to the uppermost portion of an adjusting area, which is defined by the plurality of notches. Therefore, when the headrest body is in the stored position, the headrest body stands out from the upper portion of the seat-back.

The projecting headrest may block the vision of the vehicle operator even though the headrest is in the stored position. This problem is more likely to occur if the headrest is mounted on a seat other than the operator's seat and is particularly likely to occur if the headrest apparatus is mounted on a seat behind the operator.

Further, many vehicles are now equipped with seats that fold into storage positions or seats that fold so that they may be moved within the vehicle or removed from the vehicle. For such seats, it is advantageous to have the headrest retract as far as possible so that the stored seat occupies the smallest possible volume.

SUMMARY OF THE INVENTION

The advantages and purpose of the invention will be set forth in part in the description which follows, and in part will be obvious from the description, or may be learned by practice of the invention. The advantages and purpose of the invention will be realized and attained by means of the elements and combinations particularly pointed out in the appended claims.

To achieve the above mentioned advantages, and in accordance with the purpose of the invention, as embodied and broadly described herein, the headrest of this invention comprises a holder for mounting on a top portion of the seat-back, a stay having first and second supporting portions in parallel, the holder receiving the stay so that the stay can slide relative to the seat back substantially in the vertical direction to adjust the headrest, a headrest body attached to the stay, wherein the first supporting portion includes a plurality of first notches for retaining the headrest body at more than one elevation whereby the height of the headrest body can be adjusted, and wherein the second supporting portion has an upper portion and a lower end and includes at least one second notch for preventing the headrest body from being stored in a storage position, the second notch formed on the upper portion of the second supporting portion so as to be positioned above the first notches, the second supporting portion including a substantially uniform portion which is positioned below the second notch, the substantially uniform portion extending to substantially the lower end of the second supporting portion.

It is to be understood that both the foregoing general description and the following detailed description are exemplary and explanatory only and are not restrictive of the invention, as claimed.

BRIEF DESCRIPTION OF THE DRAWINGS

The foregoing and additional features of the present invention will become more apparent from the following detailed description of the preferred embodiment when considered with reference to the attached drawings, in which:

FIG. 1 is a side view of a vehicle seat according to the present invention;

FIG. 2 is a front view of a stay according to the present invention;

DETAILED DESCRIPTION OF THE PREFERRED EMBODIMENT

Figure 3:
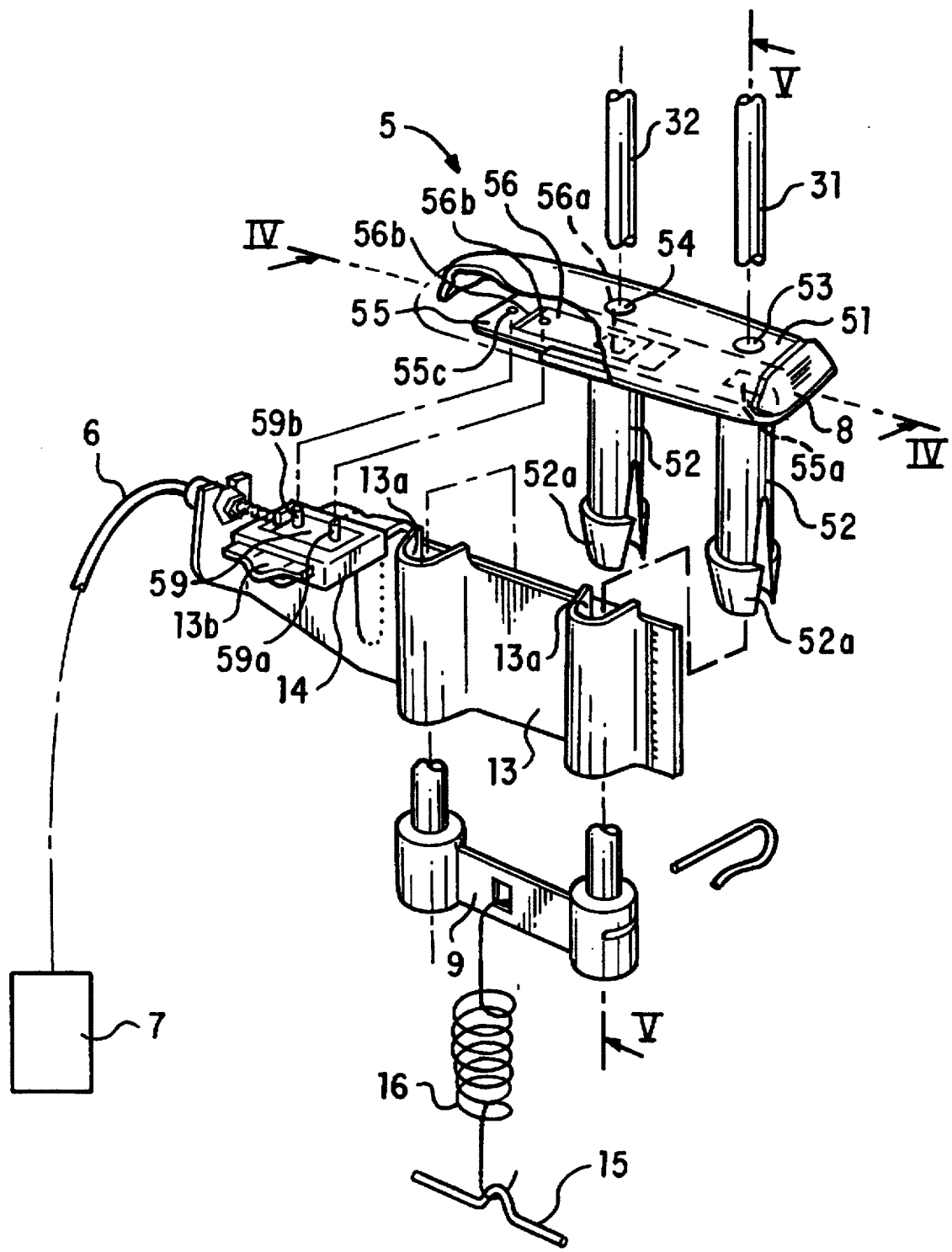
FIG. 3 is a perspective view of the headrest apparatus according to the present invention.

Reference will now be made in detail to the present preferred embodiment of the invention, an example of which is illustrated in the accompanying drawings. Wherever possible, the same reference numbers will be used throughout the drawings to refer to the same or like parts.

The preferred embodiment of the invention is a headrest apparatus for a vehicle. Two stays support a headrest. The first stay includes a plurality of notches that define an adjusting range of the headrest, while the second stay includes at least one notch that defines a stored position of the headrest. The notches of the first stay cooperate with a first latch mechanism, while the at least one notch of the second stay cooperates with a second, distinct, but interconnected latch mechanism.

The headrest apparatus of the preferred embodiment is well suited for a seat other than an operator's seat and is particularly suited for a seat behind the operator's seat. The seat occupant controls the first latch mechanism to adjust the headrest within the adjusting range, while the operator controls the second latch mechanism to move the headrest to the rest position. Thus, an operator such as an automobile driver can remotely move a headrest blocking the operator's line of vision to the stored position.

As shown in FIG. 1, a vehicle seat 1 includes a seat-back 11 and a seat-cushion 12. The seat 1 is preferably, but not necessarily, a rear seat for a vehicle such as an automobile, a truck, a sport utility vehicle, a van, or a mini-van. The seat-back 11 stands on the rear portion of the seat-cushion 12 and supports the back of a sitter. A headrest apparatus 2 is mounted on the top portion of the seat-back 11 and supports the head of the sitter. The headrest apparatus 2 includes a stay 3, a headrest body 4, and a holder 5.

As shown in FIG. 1 and FIG. 2, the stay 3 is shaped into a circular pipe and has an approximately reversed U shape. While a circular cross section is preferable, other cross sectional shapes such as oval, circular, square, or rectangular, for example, are possible. The stay 3 has a pair of parallel supporting portions 31, 32 and a connecting portion 33. The supporting portions 31, 32 extend vertically in the direction of the seat-back 11 and are connected together through the connecting portion 33.

A plurality of first notches 34 are formed in the supporting portion 31 of the stay 3. The first notches 34 open toward the inside of the stay 3 and form a line along the longitudinal direction of supporting portion 31. The first notches 34 define an adjusting area A corresponding to the lower portion of the supporting portions 31, 32 which is positioned between the lower most notch 34a and the upper most notch 34b.

A second notch 35 is formed in the other supporting portion 32. The second notch 35 opens toward the outside of the stay 3 and is positioned opposite the upper most notch 34b of the plurality first notches 34. The second notch 35 defines a stored area B corresponding to an upper portion of the supporting portions 31, 32 above the adjusting area A and the notch 35.

As shown in FIG. 1, the headrest body 4 is fixed to the connecting portion 33 of the stay 3. The headrest body 4 of the preferred embodiment has a generally reversed L shape and includes an attached portion 41 and backing portion 42. The attached portion 41 is positioned on the top portion of the seat-back 11 and attaches the headrest body 4 to the connecting portion 33. The backing portion 42 is preferably integrally connected to the attached portion 41 and projects from a front surface of the seat-back 11, so that the headrest body 4 can support the head of the sitter.

Figure 4:
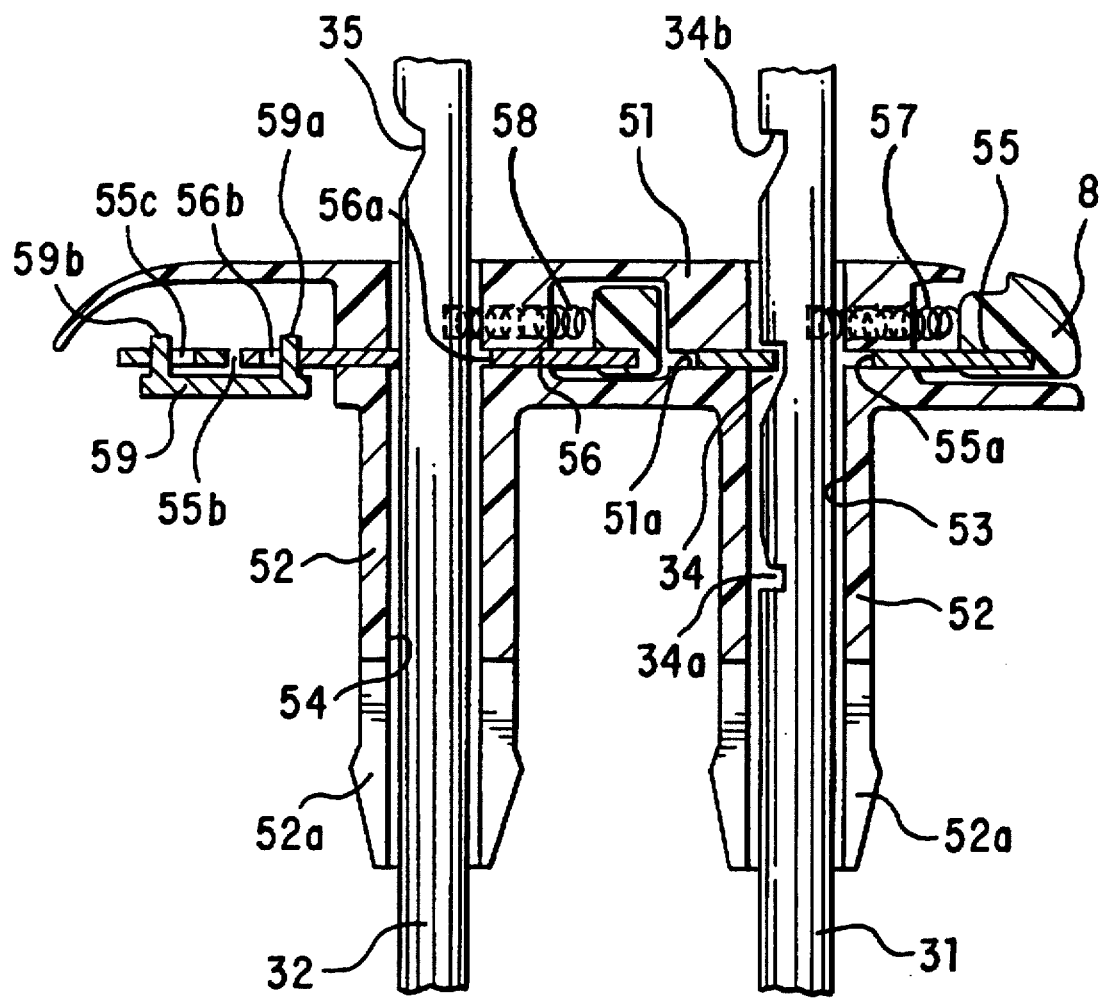
FIG. 4 is a cross-sectional view taken along line IV—IV in FIG. 3.

Referring to FIG. 3 and FIG. 4, the holder 5 is fixed to a frame (not shown) of the seat-back 11 through a bracket 13 and includes a base portion 51 and a pair of leg portions 52. The base portion 51 is positioned on the top portion of the seat-back 11 so as to be exposed. The leg portions 52 extend downward from the base portion 51 so as to be positioned inside the seat-back 11. An engaging portion 52a is secured to or formed on the tip of each leg portion 52.

A pair of first through holes 53, 54 in the holder 5 allow the supporting portions 31, 32 to pass through the leg portions 52 and the base portion 51. The first through holes 53, 54 extend vertically along the seat-back 11 in a straight line or an approximately straight line. A pair of second through holes 13a exist in the bracket 13. The second through holes 13a extend vertically along the seat-back 11 in a straight line. The leg portions 52 of the holder 5 are inserted In the second through holes 13a of the bracket 13.

The engaging portions 52a of the leg portions 52 engage the bracket 13. Therefore, the holder 5 is fixed to the bracket 13. The supporting portions 31, 32 of the stay 3 are inserted in the first through holes 53, 54. Therefore, the stay 3 is slidably supported by the holder 5 vertically along the seat-back 11. As a result, the headrest body 4 can be vertically adjusted.

Figure 5:
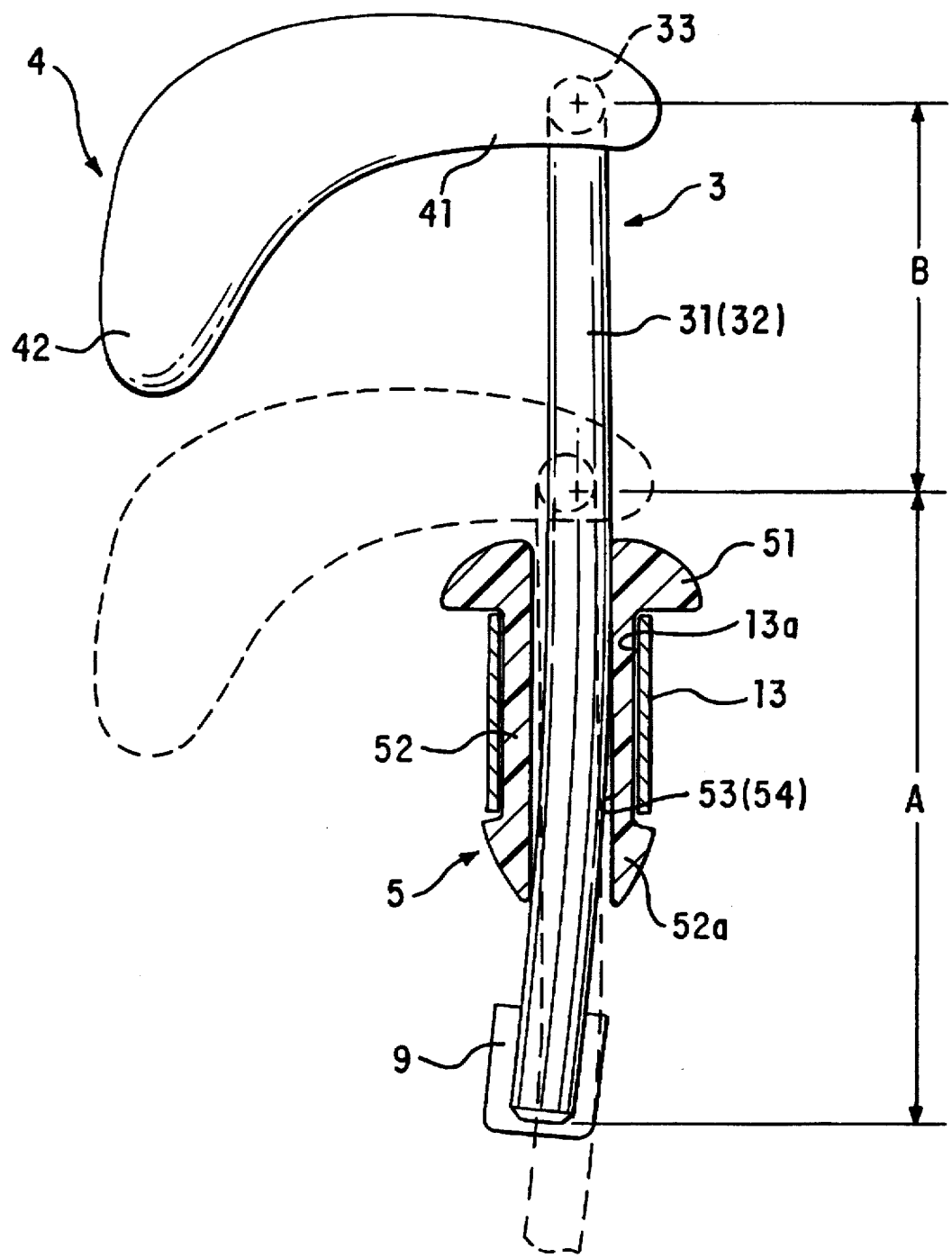
FIG. 5 is a cross-sectional view taken along line V—V in FIG. 3.

As shown in FIG. 5, the lower portions of supporting portions 31, 32 of the stay 3, that correspond to the adjusting area A, are shaped into a circular or curved configuration relative to the first through holes 53, 54 so as to slant toward the front of the seat-back 11. The upper portions of supporting portions 31, 32 of the stay 3, that correspond to the stored area B, are shaped in a straight configuration the same as the first through holes 53, 54. Therefore, when the lower portions of supporting portions 31, 32 of the stay 3 are inserted into the first through holes 53, 54 of the holder 5, the headrest body 4 does not shake to the front and rear direction of the seat-back 11. Further, when the upper portions of supporting portions 31, 32 of the stay 3 is inserted into the first through holes 53, 54 of the holder 5, the headrest body 4 moves smoothly relative to the seat-back 11.

Referring again to FIG. 3 and FIG. 4, a groove 51a is formed in the base portion 51 of the holder 5. The groove 51a extends to left and right direction of the holder 5 so as to intersect the first through holes 53, 54 of the holder 5.

A first lock plate 56 is inserted in the groove 51a. The first lock plate 55 is supported on holder 5 and is slidable to the left and right direction of the holder 5. An aperture 55a is formed in the first lock plate 55. The diameter of the aperture 55a is the same as the diameter of the first through hole 53. The aperture 55a is lined-up with the first through hole 53, and the supporting portion 31 of the stay 3 is inserted into the apertures 55a and 53. An edge of the aperture 55a engages and disengages the first notches 34 as the lock plate 55 slides. An opening 55b is formed in the first lock plate 55.

A second lock plate 56 is inserted in the opening 55b of the first lock plate 55. The width of the second lock plate 56, from left to right along of the holder 5 is smaller than the width of the opening 55b of the first lock plate 65. Therefore, the second lock plate 56 is supported on the holder 5 relative to the first lock plate 55 and can slide left and right along holder 5. An aperture 56a is formed in the second lock plate 56. The diameter of the aperture 56a is the same as the diameter of the first through hole 54. The aperture 56a is lined-up with the first through hole 54, and the supporting portion 32 of the stay 3 is inserted into the apertures 56a and 54. An edge of the aperture 56a engages and disengages the second notch 35 as the second lock plate 56 slides.

A spring 57 is mounted between the first lock plate 55 and the base portion 51. The spring 57 pushes the first lock plate 55 such that the edge of the aperture 55a engages the first notches 34. A spring 58 pushes the second lock plate 56 such that the edge of the aperture 56a engages the second notch 35.

A flange 13b is formed as part of the bracket 13. The flange 13b supports a connecting plate 59 through a guiding member 14. The connecting plate 59 slides to the left and right direction of the holder 5. The guiding member 14 is fixed to the flange 13b. The connecting plate 59 is connected between the first lock plate 55 and the second lock plate 56. An oblong hole 55c is formed in the first lock plate 55.

A pair of through pins 59a, 59b project from the connecting plate 59. The through pin 59a is inserted in the circular hole 56b of the second lock late 56. The through pin 59b is inserted in the oblong hole 55c of the first lock plate 55. When the first lock plate 55 engages the first notches 34, the second through pin 59b is positioned to the left end of the oblong hole 55c (shown in FIG. 4). Therefore, the connecting plate 59 defines an interlocking condition between the first lock plate 55 and the second lock plate 56 and a non-interlocking condition between the first lock plate 55 and the second lock plate 56.

A cable 6 connects an operating handle 7 to the connecting plate 59. The operating handle 7 is preferably mounted within the vehicle near the driver of the vehicle. Thus, if the seat 1 is not the driver's seat, the handle 7 is positioned remotely from the headrest apparatus 2. In contrast, an operating knob 8 is part of the headrest apparatus 2 and is positioned to be operated by someone using the seat 1. In the preferred embodiment, the operating knob 8 is fixed to the first lock plate 55.

As shown in FIG. 3, a connecting member 9 is fixed between the ends of the supporting portions 31, 32 of the stay 3. A spring 16 is mounted between the connecting member 9 and a member 15 of the seat-back 11. The spring 16 biases the stay 3 into the seat back 11. Thus, in this embodiment, the headrest body 4 naturally tends to move downward toward the seat 1.

As shown in FIG. 4, the stay 3 is supported by the holder 5 in the adjusting area A of the supporting portion 31, 32. The first lock plate 55 engages the first notches 34 of the supporting portion 31. The second lock plate 56 is disengaged from the second notch 35 of the supporting portion 32. The headrest body 4 thus extends above the seat back 11 between the upper most adjusting position D and the lower most adjusting position C (shown in FIG. 1). In the state shown in FIG. 4, the first lock plate 55 prevents the headrest body from moving up or down along the direction of the seat-back 11. As a result, the backing portion 42 of the headrest body 4 supports the head of the sitter.

When a user of the seat 1 manipulates the operating knob 8, the first lock plate 55 slides against the spring 57. At this time the second lock plate 56 does not slide against the spring 58. Rather, the pin 59b slides within the oblong hole 55c of the first lock plate 55 while the first lock plate 55 moves. Therefore, the connecting plate 59 does not slide. The headrest body 4 can thus move between the upper most adjusting position D and the lowest adjusting position C. This movement is along the direction of the seat back 11. Thus, the user can adjust the position of the headrest to a desired position within the adjusting range A.

When the headrest body 4 is in the lowest adjusting position C, the first lock plate 55 engages the upper most notch 34b of the first notches 34. At this time, the second lock plate 56 engages the second notch 35.

When the driver operates the operating handle 7, the first lock plate 55 slides against the spring 57 through the connecting plate 59. At this time, the second lock plate 56 slides against the spring 58 through the connecting plate 59. The headrest body 4 then moves down in the direction of the seat-back 11 because of the bias of the spring 16. The headrest body 4 will come to rest with the stay 3 supported by the holder 5 in the stored area B of the supporting portions 31, 32. As a result, the headrest 4 is positioned in a stored position E (shown in FIG. 1) such that the headrest does not block the drivers view. This is particularly useful for obtaining a clearer field of view behind the driver when, for example, moving the vehicle backwards.

In a modification of the preferred embodiment, the cable 6 is connected to a mechanism which adjusts the vehicle seat 1 to a stored or folded position. This connection may be made in addition to or instead of the connection to the operating handle 7. Therefore, adjusting the vehicle seat 1 to the stored or folded position will automatically cause the headrest 4 to retract into its stored position.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A headrest for a vehicle seat which has a seat-back to support the back of a user of the seat, the headrest comprising:

a holder for mounting on a top portion of the seat-back;

a stay having first and second supporting portions in parallel, the holder receiving the stay so that the stay can slide relative to the seat back substantially in the vertical direction to adjust the headrest;

a headrest body attached to the stay;

wherein the first supporting portion includes a plurality of first notches for retaining the headrest body at more than one elevation whereby the height of the headrest body can be adjusted, and wherein the second supporting portion includes a second notch;

a first lock plate slidably supported on the holder for engaging and disengaging the first notches;

a second lock plate slidably supported on the holder for engaging and disengaging the second notch;

a first operating member for operating the first lock plate so as to be disengaged from the first notches; and a second operating member for operating the first lock plate and the second lock plate so as to be disengaged from the first notches and the second notch.

2. The headrest according to claim 1, further comprising:

a connecting plate connected between the first lock plate and second lock plate, the first lock plate sliding during disengagement from the first notches and having an oblong aperture extending in the direction of sliding of the first lock plate; and a through pin projecting from the connecting member and inserted into the oblong aperture.

* * * * *